June 8, 1943.　　　G. S. LEWIS　　　2,321,150
COASTER BRAKE
Filed Dec. 26, 1941　　　2 Sheets-Sheet 1
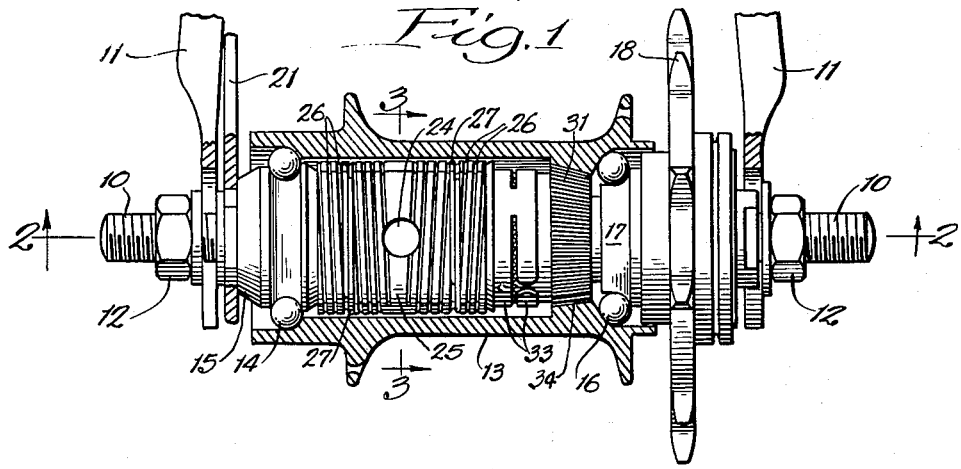
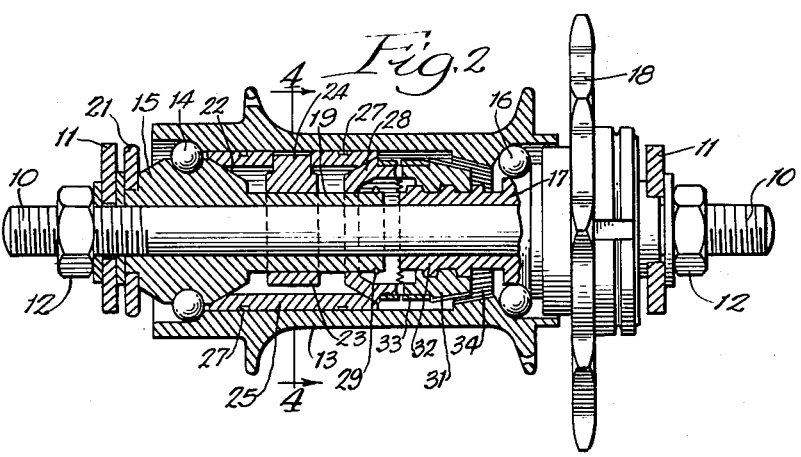
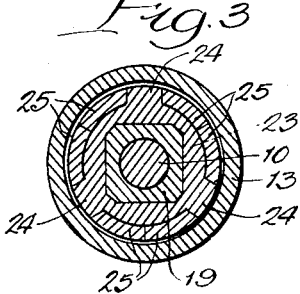
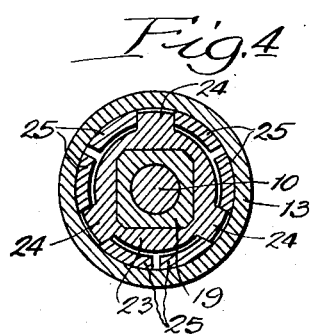
Inventor:
George S. Lewis,
By Dawson, Coms & Booth,
Attorneys.

June 8, 1943.  G. S. LEWIS  2,321,150
COASTER BRAKE
Filed Dec. 26, 1941    2 Sheets-Sheet 2
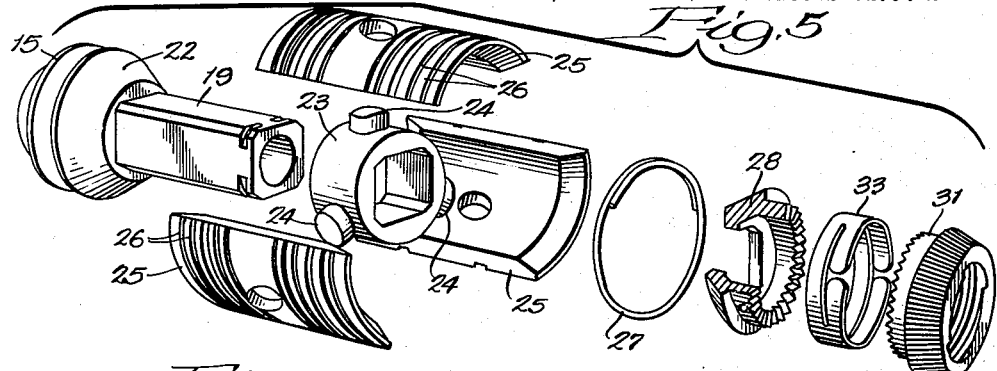
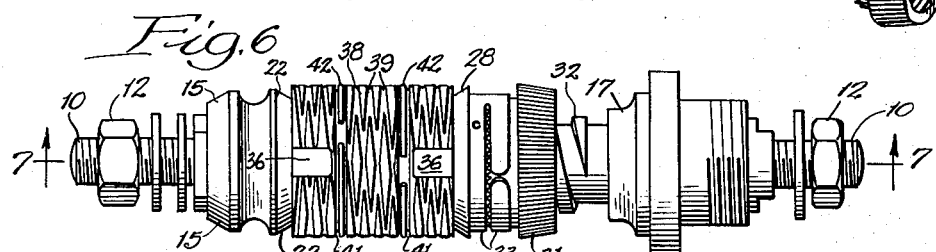
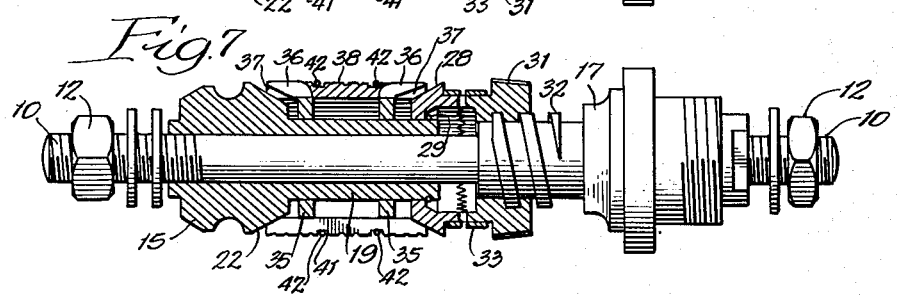
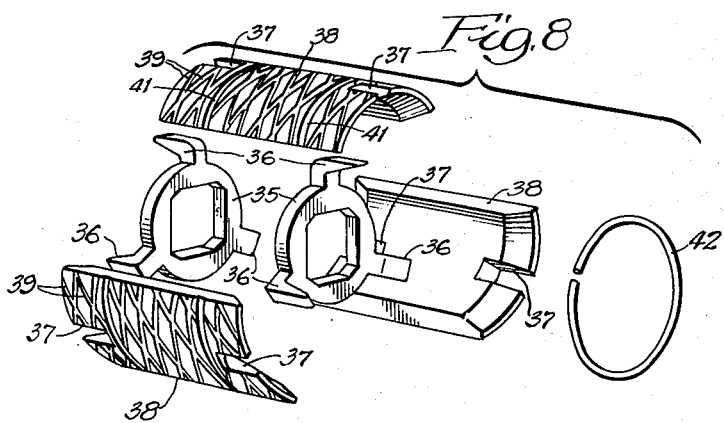
Inventor:
George S. Lewis,
By Dawson, Coons and Booth
Attorneys.

Patented June 8, 1943

2,321,150

UNITED STATES PATENT OFFICE 2,321,150

COASTER BRAKE

George S. Lewis, Evanston, Ill.

Application December 26, 1941, Serial No. 424,424

5 Claims. (Cl. 192—6)

This invention relates to coaster brakes and more particularly to an improved coaster brake of the type adapted for use on bicycles or the like.

One of the objects of the invention is to provide a coaster brake which is simple and inexpensive in construction, and extremely reliable and powerful in action.

Another object of the invention is to provide a coaster brake in which the friction elements are formed by separate shoes adapted to be expanded radially into engagement with the wheel hub or spool.

Another object of the invention is to provide a coaster brake in which the friction elements are moved by cones engaging their ends. With this construction, the surfaces of the brake elements remain parallel at all times with the spool surfaces which they are to engage, so that the brake elements will wear evenly.

Another object of the invention is to provide a coaster brake in which braking is effected by separate detached brake elements held assembled and out of braking position by an annular spring and adapted to be expanded into braking position by a cone-shaped mechanism.

The above and other objects and advantages of the invention will be more readily apparent from the following description when read in connection with the accompanying drawings, in which:

Figure 1 is an axial section with parts in elevation of a coaster brake embodying the invention; Fig. 2 is a complete axial section of the coaster brake; Fig. 3 is a section on the line 3—3 of Fig. 1 with the brake released; Fig. 4 is a similar section on the line 4—4 of Fig. 2, with the brake engaged; Fig. 5 is an expanded view showing the several brake parts in disassembled position; Fig. 6 is an elevation of an alternative brake construction; Fig. 7 is an axial section on the line 7—7 of Fig. 6; and Fig. 8 is a partial disassembled view of the brake mechanism of Figs. 6 and 7.

As shown in Figures 1 to 6, the brake comprises an axle 10 adapted to be fixed in the ends of forked members 11 forming a part of the bicycle frame. The axle is held in place by nuts 12 threaded on the ends thereof and holding it assembled on the fork.

A wheel hub or spool 13 is rotatably supported around the axle between the forks and is of a size to leave an annular space between the axle and the interior of the spool. The spool is supported on bearing balls 14 carried by a fixed cone block 15 mounted on the axle at one end of the spool and by similar bearing balls 16 carried by a sprocket hub 17. A sprocket 18 is fixedly secured on the hub 17 at one side of the spool for driving engagements with the usual chain.

The cone block 15 is formed with an extension 19 projecting axially into the hub, and of non-circular section on its exterior, as shown in Figs. 3 and 4. The cone block and its extension may be held against rotation by means of a brake arm 21 adapted to be connected to the fork or to any other suitable stationary part of the bicycle. The cone block 15 is formed with a conical face 23 facing toward the interior of the spool and adapted to assist in operation of the braking elements, as will be described later.

A spider 23 formed with an opening to fit over the extension 19 is slidably mounted on the extension and has at its periphery a plurality of radially extending guide pins 24. As shown, three such guide pins are provided for cooperation with three friction shoes, but it will be understood that any desired number in excess of three might be employed. The guide pins 24 support a plurality of friction shoes 25, having cylindrical exterior surfaces formed with oil grooves 26. As shown, the pins project through cylindrical openings in the central part of the shoes to support the shoes for radial movement in the spool. The shoes are held in assembled position on the spider by means of annular springs 27, which may be flat or round, or of any desired cross-section, fitting in grooves in the shoes so as to lie below the surface thereof. The springs, as best seen in Figure 5, may comprise an elongated piece of spring wire bent around into an annulus normally slightly smaller than the circle of the friction shoes so as to squeeze the friction shoes together against the spider. In this position, clearance will be provided between the friction shoes and the interior of the spool so that the spool may turn freely with no drag against the shoes.

The friction shoes are preferably formed of a metal for cooperation with the spool which is generally of steel. One material I have found to be particularly advantageous is a self-lubricating alloy of copper with tin or iron or with other suitable metals, formed by mixing such alloy powder or filings with a lubricant such as oil or graphite, and pressing it under high pressure to the desired shape. When this material is used, no additional lubricant is required and the shoes will operate freely in coasting position for a long period of time with no attention.

The shoes are adapted to be actuated by a second cone member 28 slidable on the extension 19 and formed with a conical surface spaced from and facing the surface 22. The cone members 22 and 28 are adapted to engage the opposite ends of the shoes 25 so that when the cone members are moved together, the shoes will be spread outwardly into frictional engagement with the inner surface of the spool. Due to the fact that the cone surfaces engage the friction shoes at spaced points, the shoes will be maintained parallel to the spool surface at all times and will be moved uniformly and evenly into engagement therewith. The cone member 28 may be held on the extension 19 by a spring clip 29 fitting on the end of the extension and preventing the cone member from sliding off of the extension.

The cone member 28 is adapted to be operated by a clutch member 31 threaded on to an extension 32 of the sprocket hub. The threaded engagement between the members 31 and 32 is preferably formed by a very coarse thread to provide a relatively rapid movement with a minimum of friction. At their facing ends, the cone member 28 and the clutch member 31 are formed with a series of facing teeth adapted to lock the two members against relative rotation to provide for ease of control. The cone member 28 carries a spring collar 33, shown in Figure 5 as having spaced spring fingers which bear against the exterior of the clutch member 31 to provide a light friction drag thereon, tending to hold it against rotation.

The clutch member 31 is formed at its opposite end with a conical portion which may, if desired, be formed, as shown, for engagement with a complementary conical portion 34 formed on the interior of the sleeve. When the clutch member is moved to the right, as seen in Figures 1 and 2, it will engage the clutch portion 34 to connect the sprocket drivably to the spool.

In operation, when the spool and wheel are being driven from the sprocket, the parts will be in the position shown in Figure 1, with the clutch member 31 engaging the clutch portion 34 of the spool. Driving forward on the sprocket tends to move the clutch member 31 further to the right, thereby providing a tight clutching engagement, so that the wheel will be driven from the sprocket. If it is desired to coast, the sprocket may be stopped or moved very slightly backward, which will cause the clutch member 31 to move to the left on the threaded extension 32 until it becomes disengaged from the clutch surface 34. At this time, all of the parts are free, and the wheel and spool may turn freely on the bearings. For braking, the sprocket may be turned further in a reverse direction, causing the clutch member to move further to the left into engagement with the cone member 28. As soon as the teeth on the ends of these two members are engaged, further rotation of the clutch member will be prevented, and continued turning of the sprocket in the reverse direction will move both the clutch member and the cone member 28 to the left. This operation presses the cone member 28 against the right ends of the friction shoes, causing them to move axially against the cone 22 and to expand against the springs 27. Any desired expansive force may be created by exerting greater force on the sprocket so that the friction shoes may be pressed into braking engagement with the inner surface of the spool to brake it. As soon as the force on the sprocket is released, the parts will spring back to the coasting position, and upon forward rotation of the sprocket, the clutch member 31 will again be moved to the right into driving engagement with the complementary surface 34.

An alternative construction is illustrated in Figs. 6, 7 and 8, parts therein which are identical with corresponding parts in Figs. 1 to 5 being indicated by the same reference numbers. In this construction, the single spider 23 is replaced by a pair of spiders 35 having angular extensions 36 extending radially therefrom. The extensions 36 fit slidably in grooves or slots 37 in the ends of the brake shoes 38, so that the shoes are supported adjacent their opposite ends and so that a relatively wide bearing area between the spiders and brake shoes is provided. It will be noted from Figure 7 that the extensions 36 are cut away at their lower sides to provide clearance for the cones 22 and 28.

In this construction, the exterior of the friction shoes is shown as formed with criss-cross oil grooves 39, rather than with spiral grooves, as illustrated in the first embodiment. It will be understood that any desired configuration of oil grooves might be employed to conduct oil away from the engaging surfaces during the braking operation, and that the two examples illustrated merely show two types which are satisfactory.

The shoes 38 are formed with annular grooves 41 therein to receive annular springs 42 formed by a strip of spring wire bent into an annulus with its ends spaced. Otherwise, the construction of Figures 6 to 8 is substantially identical with that of Figures 1 to 5, and operates in the same manner.

Up to the present, it has been common practice to make brake shoes in the form of an open ring with its diameter materially less than the inside diameter of the spool when ring is at "set." When braking the ring is expanded by various means, usually by some form of wedge in the opening of the ring. Obviously if the ring is round in its "set" position, it will be distorted in its expanded position, with the result that contact with inside surface of the spool will be imperfect.

In contrast to the above, the various segments in the brake shoes herein described have the same radius as the inside of the spool, subject only to a small plus or minus tolerance of a few thousands of an inch, as required for commercial manufacturing. Obviously, by this method, the brake shoes when expanded are in full contact with the inside surface of the spool.

While two embodiments of the invention have been shown and described in detail, it will be understood that these are illustrative only and are not to be taken as a definition of the scope of the invention, reference being had for this purpose to the appended claims.

I claim:

1. A coaster brake comprising an axle, a spool rotatably mounted around the axle and adapted to carry a wheel, a sprocket rotatable on the axle, an elongated threaded hub on the sprocket, a fixed cone member in the spool at one end thereof having a non-circular extension around the axle projecting into the spool, means for holding the cone member against rotation, a spider having a non-circular opening slidably fitting over said extension and a plurality of radial pins, a plurality of friction shoes having openings therein slidably receiving the pins and lying in annular array in the spool with one end adjacent the cone, and a control member threaded on the sprocket hub having a clutch member on one end and a cone on the other and movable in one direction to connect the spool and sprocket and in the other direction to engage the cone with the other end of the friction shoes to spread them into engagement with the spool.

2. A coaster brake comprising an axle, a spool rotatably mounted around the axle and adapted to carry a wheel, a sprocket rotatable on the axle, an elongated threaded hub on the sprocket, a fixed cone in the spool at one end thereof having a non-circular extension around the axle projecting into spool, means for holding the cone member against rotation, a slidably-mounted spider having a non-circular opening receiving said extension, a plurality of friction shoes lying in annular array in the spool with one end adjacent the cone, means associated with said spider and said friction shoes for preventing rotary movement of said friction shoes, and control means threaded on the sprocket hub having a clutch member on one end and a cone on the other and movable in one direction to connect the spool and sprocket and in the other direction to engage the cone with the other end of the friction shoes to spread them into engagement with the spool.

3. A coaster brake comprising an axle, a spool rotatably mounted around the axle and adapted to carry a wheel, a sprocket rotatable on the axle, an elongated threaded hub on the sprocket, a fixed cone in the spool at one end thereof having a non-circular extension around the axle projecting into the spool, means for holding the cone member against rotation, a pair of spaced spiders having a non-circular opening slidably receiving said extension, projections carried by said spiders, a plurality of friction shoes having openings at the ends thereof slidably receiving said projections on said spiders, said shoes lying in annular array in the spool with one end adjacent the cone, and control means threaded on the sprocket hub having a clutch member on one end and a cone on the other and movable in one direction to connect the spool and sprocket and in the other direction to engage the cone with the other end of the friction shoes to spread them into engagement with the spool.

4. A coaster brake comprising an axle, a spool rotatably mounted around the axle, and adapted to carry a wheel, a sprocket rotatable on the axle, an elongated threaded hub on the sprocket, a fixed cone in the spool at one end thereof having a non-circular extension around the axle projecting into the spool, means for holding the cone member against rotation, a slidably-mounted spider having a non-circular opening receiving said extension, a plurality of friction shoes lying in annular array in the spool with one end adjacent the cone, means associated with said spider and with a central portion of said shoes for preventing rotary movement of said shoes, and control means threaded on the sprocket hub having a clutch member on one end and a cone on the other and movable in one direction to connect the spool and sprocket and in the other direction to engage the cone with the other end of the friction shoes to spread them into engagement with the spool.

5. A coaster brake comprising an axle, a spool rotatably mounted around the axle and adapted to carry a wheel, a sprocket rotatable on the axle, an elongated threaded hub on the sprocket, a fixed cone in the spool at one end thereof having a non-circular extension around the axle projecting into the spool, means for holding the cone member against rotation, a spider provided with a non-circular opening receiving said extension to permit longitudinal travel of said spider, a plurality of friction shoes lying in annular array in the spool with one end adjacent the cone, means slidably connecting said friction shoes and said spider to permit outward movement of said shoes but to prevent rotation thereof, and control means threaded on the sprocket hub having a clutch member on one end and a cone on the other and movable in one direction to connect the spool and sprocket and in the other direction to engage the cone with the other end of the friction shoes to spread them into engagement with the spool.

GEORGE S. LEWIS.